United States Patent [19]

Steckowich, Jr.

[11] 4,130,262
[45] Dec. 19, 1978

[54] ADJUSTABLY INTERFITTING PANEL CLAMP

[75] Inventor: John Steckowich, Jr., Edison, N.J.

[73] Assignee: Burroughs Corporation, Detroit, Mich.

[21] Appl. No.: 834,192

[22] Filed: Sep. 19, 1977

Related U.S. Application Data

[63] Continuation-in-part of Ser. No. 729,452, Oct. 4, 1976, abandoned.

[51] Int. Cl.² .............................................. F16B 1/04
[52] U.S. Cl. ................................................. 248/226.1
[58] Field of Search .................... 248/316, 226.1, 429, 248/430, 229; 52/588, 620; 24/263 A, 263 LS; 269/244, 181, 173; 85/32 V

[56] References Cited

U.S. PATENT DOCUMENTS

| | | | |
|---|---|---|---|
| 231,126 | 8/1880 | Webb et al. | 248/226.1 |
| 603,560 | 5/1898 | Firth et al. | 269/244 X |
| 1,703,069 | 2/1929 | Strupe | 248/226.1 |
| 3,382,753 | 5/1968 | Tinnerman | 85/32 V |
| 3,789,724 | 2/1974 | Moran | 85/32 V |
| 3,881,698 | 5/1975 | Marsh | 248/226.1 |
| 3,905,271 | 9/1975 | Leczycki | 85/32 V |

Primary Examiner—Francis K. Zugel
Attorney, Agent, or Firm—Gerald J. Woloson; Edward J. Feeney, Jr.; Kevin R. Peterson

[57] ABSTRACT

An adjustable clamp includes two overlying, interfitting, L-shaped members together with an anchor screw. A panel is held in an adjustable space between the arms of one portion of each L. The arms in the other portion of each L interfit through a set of interdigital bands and apertures formed in the respective arms. The interfitting arms are slideably adjustable relative to each other. The anchor screw, which can attach the clamp and held panel to a support surface such as a printed circuit board, passes between the interfitting arms to secure them together while simultaneously causing their relative sliding movement to produce the adjustable clamping action.

12 Claims, 4 Drawing Figures

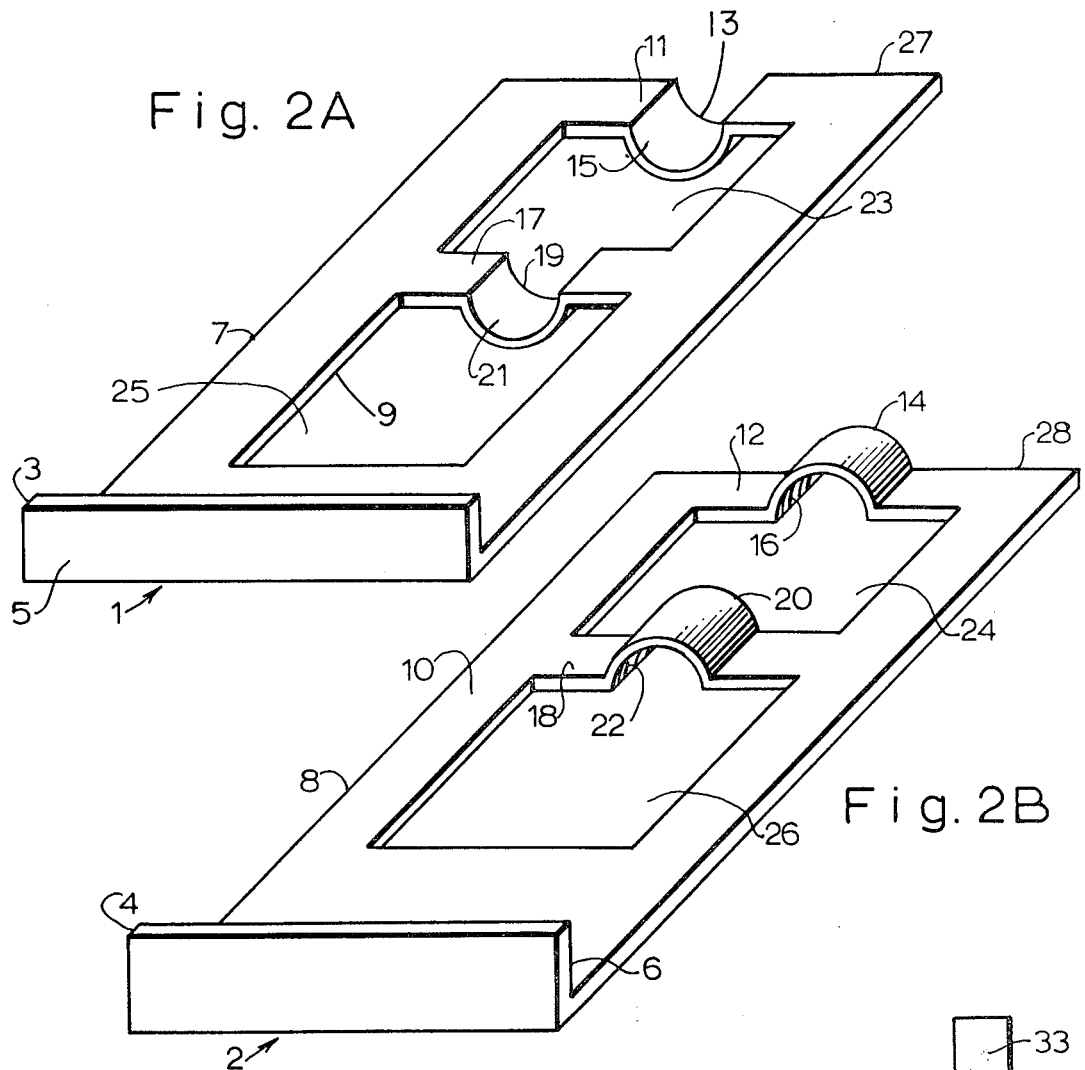
Fig. 2A
Fig. 2B
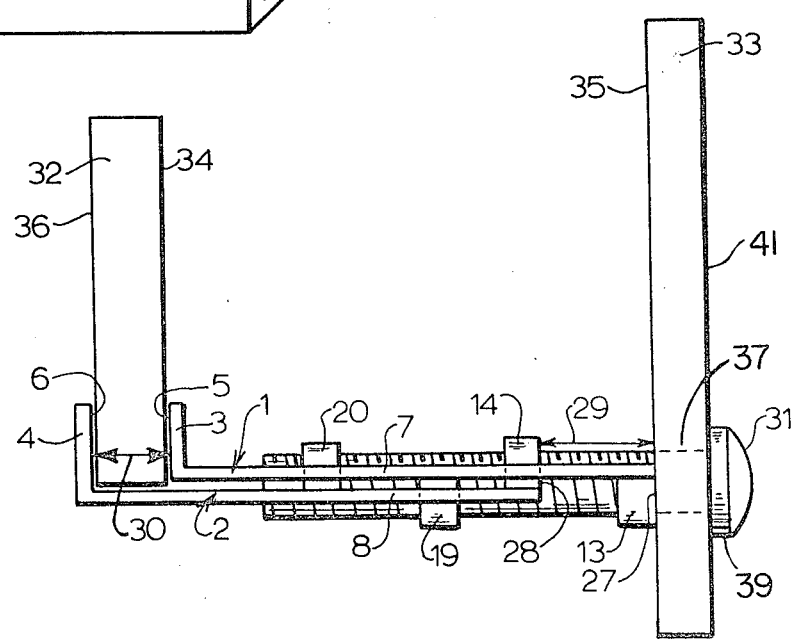
Fig. 3

ADJUSTABLY INTERFITTING PANEL CLAMP

CROSS REFERENCE TO RELATED APPLICATION

This application is a continuation-in-part of application Ser. No. 729,452, filed Oct. 4, 1976, now abandoned.

BACKGROUND OF THE INVENTION

1. Field of the Invention

The invention relates generally to clamping devices and in particular to apparatus for producing an adjustable clamping action. More specifically, the invention relates to adjustable clamps specially adapted to support fragile panels of various thicknesses, for example display panels in electronic calculators.

2. Description of the Prior Art

The novel nature of the claimed invention is evident from a comparison with the prior art. Prior art adjustable clamps having opposing jaws activated by overlying members extending to a common side of the jaws are exemplified in U.S. Pat. No. 2,862,435 and British Pat. No. 3,858, Feb. 25, 1884. The extension members of these patents, however, do not interfit, and thus lack essential aspects of the claimed invention. U.S. Pat. Nos. 2,181,831 and 3,789,724 show support and anchor devices in which interfitting members are locked together by an auxiliary element. These patents, however, do not disclose clamping apparatus in which the auxiliary element initiates adjustable clamping action.

The prior art shows no device comparable to the disclosed apparatus for the particular application of adjustably clamping and supporting variable-sized fragile display panels in electronic calculators. Moreover, the use of existing clamps for this purpose creates a number of difficulties, all of which are eliminated by the claimed invention.

Among the prior art apparatus available for clamping and supporting fragile display panels of various sizes are adjustable pliers of the standard clothespin and parallel jaws type, adjustable C clamps, and devices wherein the fragile panel is cemented to a support surface.

When used for the support of fragile panels such as glass-envelope display apparatus, these prior art clamps are unsatisfactory for a number of reasons. One problem is that the clamps are not easily adapted to maintaining a display panel parallel to a support panel such as a printed circuit board. Another problem is that the clamps apply pressure non-uniformly across the surfaces of the held panel. These non-uniform pressures create stresses which tend to crack the fragile envelope. Such non-uniform pressures result from the inherent mechanical structure of the typical prior art clamps.

In the standard plier-type adjustable clamp, the pressure-receiving ends of the dual lever system as well as the connection fulcrum are located external to the surface contours of the clamped panel. As a result, the pressure-application jaws trace out a circular arc rather than a linear path as they approach the panel surface. Because the flat jaws of such pliers are mounted at a fixed angle with respect to their associated levers, motion along a circular arc causes each jaw to contact the held panel non-uniformly at one point on the jaw rather than uniformly along the entire surface of the jaw.

Even with parallel pliers in which the jaws are configured to remain parallel to the held panel, the force-receiving ends of the dual lever system as well as the connection fulcrum are still located external to the contours of the clamped panel. This generally means that as the parallel jaws close in on the panel, the ends of the jaw surfaces closest to the fulcrum apply pressure before the remainder of the jaw surfaces do. This again is a non-uniform, fracture-inducing application of pressure.

Prior art C clamps present mounting difficulties for display panels in limited-spaced environments such as electronic calculators. Because the typical C clamp has a substantial structual protrusion beyond the contours of the member it holds, an extra volume of space in the calculator chassis is required to accommodate this protrusion. In addition, the presence of the protrusion often means that the glass envelope containing the display elements has to be mounted back away from the viewing surface. As a result, the angle of view from in front of the calculator is reduced.

SUMMARY OF THE INVENTION

It is, therefore, an object of this invention to provide an adjustable clamp in which the opposing jaws are activated by interfitting members extending to a single common side of the jaws and in which an anchor means secures the interfitting members together while simultaneously sliding them to produce the adjustable clamping action.

It is another object of this invention to provide an adjustable clamp of the type described above where an additional simultaneous function of the anchor means is to attach the interlocked clamp to a support structure.

It is yet another object of this invention to provide an adjustable clamp which applies uniform pressure to the clamped surfaces of a fragile panel regardless of actual panel width.

It is still further an object of this invention to maximize the angular display visibility in devices such as electronic calculators by providing a clamp which protrudes minimally beyond the front surface of the held display panel.

It is additionally an object of this invention to provide a panel clamp which is adapted to maintaining a panel in fixed, spaced, substantially parallel relationship to a support member such as a printed circuit board.

It is also an object of this invention to provide an inexpensive, structually-simple panel clamp which can be easily manufactured and easily assembled.

Accordingly, this inveniton provides an adjustable clamp having opposing clamping jaws activated by interfitting members. The interfitting members extend to a single common side of the jaws and cooperate with a controllable anchor means. The controllable anchor means secures the interfitting extension members together while simultaneously sliding one member over the other. This sliding motion induces an adjustable clamping action between the opposing jaws attached to the sliding, interfitting extension members.

Other objects, features, and advantages will be readily apparent from the following detailed description when considered with the accompanying drawings which show by way of example and not limitation the principle of the invention and a preferred mode of applying that principle.

BRIEF DESCRIPTION OF THE DRAWINGS

FIG. 2a shows one individual member of the clamp of FIG. 1.

FIG. 2b shows the second interfitting member of the clamp of FIG. 1.

FIG. 3 is a side view of the interlocked clamp of FIG. 1 attached by an anchor screw to a support surface.

DESCRIPTION OF A PREFERRED EMBODIMENT

Figure 1:
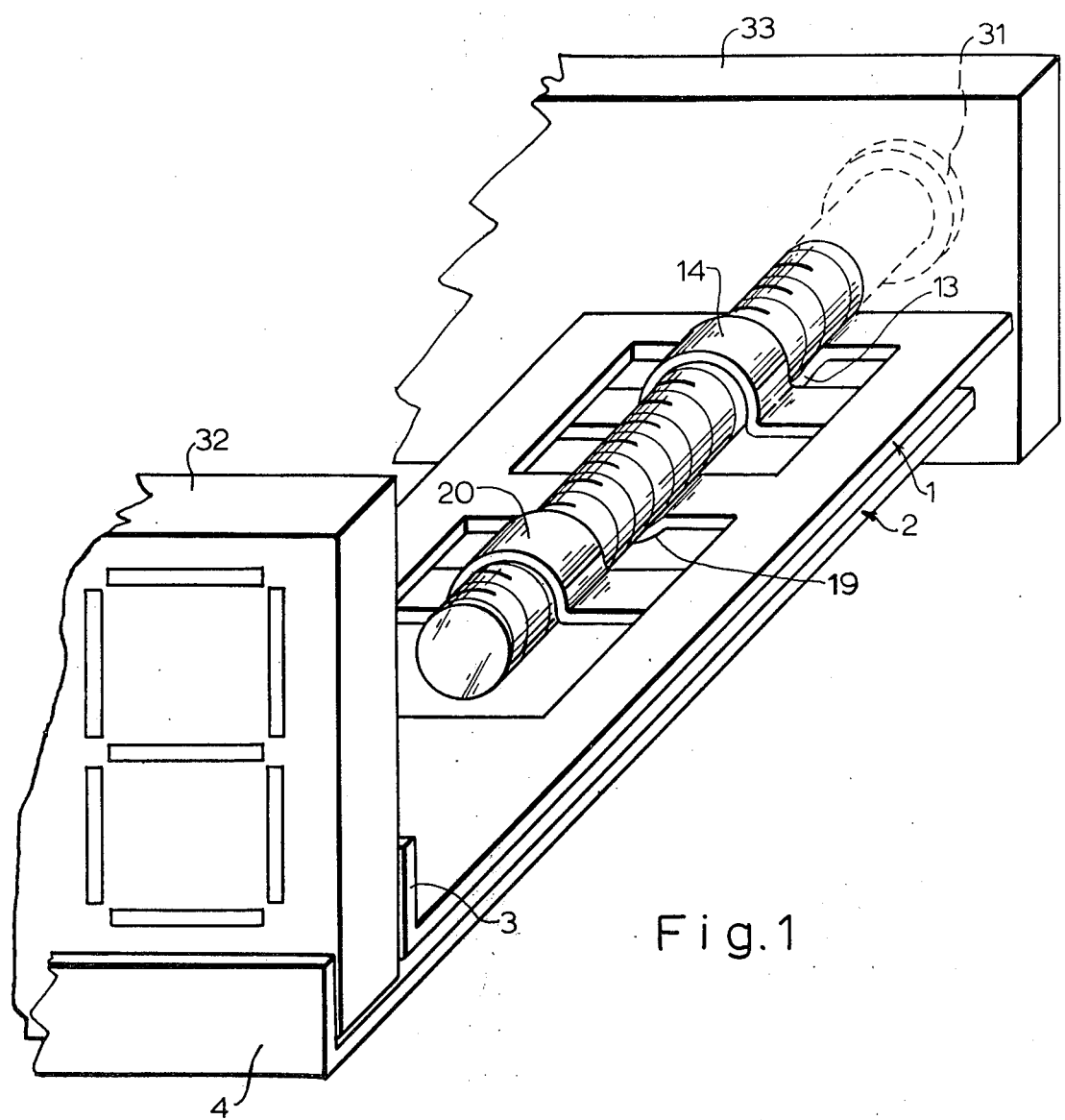
FIG. 1 is a perspective view of the clamp holding a display panel parallel to a support surface.

FIG. 1 shows the general features of one embodiment of the claimed invention as particularly adapted for holding a display panel parallel to a support surface such as a printed circuit board. The clamp includes two overlying L-shaped members 1 and 2. These members have semicylindrical bands 13, 14, 19, and 20 which interfit to create a full-cylindrical channel. The widths of the bands, measured along the length of the channel, is less than the corresponding widths of the open portions into which the bands fit. This dimension differential enables member 2 to slide with respect to member 1. The sliding varies the space between the clamping jaws 3 and 4 and produces the clamping force on a display panel 32 held therebetween. The interior surfaces of bands 14 and 20 are threaded while those of bands 13 and 19 are not. Screw 31, which attaches the clamp to support panel 33, is inserted into the half-threaded cylindrical channel. Once inserted, screw 31 secures members 1 and 2 together while simultaneously producing the slideably adjustable clamping action.

As illustrated in FIG. 2a, L-shaped member 1 is formed with a short arm as a clamping jaw 3 and an elongated arm as an extension member 7. The clamping jaw 3 is a generally flat portion having a clamping surface 5. The extension member 7 is also a flat portion having a mating surface 9. Formed into member 7 are two band-shaped members 11 and 17, each having semicylindrical portions 13 and 19 formed near the center of their lengths. Portion 13 has a non-threaded interior surface 15 and portion 19 contains a non-threaded interior surface 21. Adjacent to the bands 11 and 17 are open portions 23 and 25 formed in member 7.

FIG. 2b shows the second L-shaped clamping member 2 having a short arm as a clamping jaw 4 and an elongated arm as an extension member 8. Clamping jaw 4 is a generally flat portion having a clamping surface 6, while extension member 8 is a generally flat portion having a mating surface 10. Formed into member 8 are two band members 12 and 18, each having semicylindrical portions 14 and 20 formed near the center of their lengths. Portion 14 has a threaded interior surface 16 and portion 20 contains a threaded interior surface 22. Adjacent to the bands 12 and 18 are open portions 24 and 26 formed in member 8.

When the L-shaped members are mated as in FIG. 3, surface 9 of L-shaped member 1 fits against surface 10 of L-shaped member 2. The mated condition demonstrates how bands 13, 14, 19, and 20, together with apertures 23, 24, 25, and 26, make up a mutual interfit means having two principal features: First, the spacing of the bands and open portions in the two overlying members is such that the semicylindrical band portion 19 of L-shaped member 1 fits into open portion 24 of L-shaped member 2, while the semicylindrical band portions 14 and 20 of L-shaped member 2 fit respectively into open portions 23 and 25 of L-shaped member 1. Second, the concavity of portions 13 and 19 is opposite to the concavity of portions 14 and 20, so that when the members 1 and 2 are in overlying relationship, the semicylindrical band portions 13, 14, 19, and 20 form a locking receptacle or anchor receiving means in the shape of a full-cylindrical channel.

The widths of the band portions and open portions of members 1 and 2 are adjusted to allow sliding of one member over the other along the length of the channel. This is accomplished by making the axial width of semicylindrical portion 14 less than the corresponding width of open portion 23, by making the axial width of semicylindrical portion 19 less than the corresponding width of portion 24, and by making the axial width of semicylindrical portion 20 less than the corresponding width of open portion 25.

As shown in FIG. 3, the interlocking clamp is attached in a perpendicular fashion to a support panel 33 by a controllable anchor means such as a screw 31. To utilize the adjustable clamping action for mounting display panel 32 parallel to support panel 33, members 1 and 2 are first interfitted as shown. The relative spacing of the bands and apertures in the two overlying members is such that a panel-receiving space 30 is formed between the opposing clamping surfaces 5 and 6. Display panel 32 is then inserted between surfaces 5 and 6, and the two members are slid relative to each other by manual or other suitable means until surfaces 5 and 6 are contiguous with surfaces 34 and 36 respectively. Next, the interfitted extension members 7 and 8 are placed perpendicular to support panel 33 with anchor edge 27 of member 7 held contiguous to anchor surface 35. Because the length of extension member 8 is less than the sum of the length of extension member 7 plus the width of space 30, a gap 29 is created between the anchor edge 28 of L-shaped member 2 and the anchor surface 35 of the support panel 33. A screw 31 of length less than the length of extension member 7 is inserted through non-threaded aperture 37 of panel 33 and into the full-cylindrical channel created by interfitting bands 13, 14, 19, and 20, thereby securing members 1 and 2 together. Screw 31 is turned until head 39 contacts surface 41. As the screw is further tightened, screw 31 and non-threaded member 1, now both contiguous with non-threaded panel 33, remain stationary. Threaded member 2, however, is free to slide toward surface 35 because of gap 29, because of apertures 25 and 26, and because of the dimension differentials between the portions 14 and 23, 19 and 24, and 20 and 25. This relative sliding of member 2, caused by the further turning of the screw in contact with the threaded surfaces 16 and 22, produces the adjustable clamping action. The sliding continues until panel 32 is held firmly between the clamping surfaces 5 and 6. Thus in addition to attaching the clamp to a support panel, screw 31 performs the dual function of securing members 1 and 2 together while simultaneously causing their relative sliding movement so as to produce an adjustable clamping action.

Because the clamping jaws 3 and 4 are flat and perpendicular to their corresponding extension members 7 and 8, the opposing clamping surfaces 5 and 6 will remain parallel to each other while approaching panel 32 in a linear fashion as screw 31 is tightened causing members 1 and 2 to slide with respect to each other. As a result of this linear parallelism, jaws 3 and 4 will apply uniform pressure to surfaces 34 and 36 when contact is made with panel 32. This uniform pressure is of critical importance when panel 32 is a fragile, glass, display envelope as indicated in FIG. 1. In such a case, uniform pressure prevents the generation of stresses which could crack the glass display envelope as the clamp is adjusted to accommodate panels of various widths.

It can be seen from FIG. 3 that the perpendicularity of jaws 3 and 4 to the corresponding extension members 7 and 8, together with the perpendicularity of jaws 7 and 8 to support panel 33, causes panel 32 to be held parallel to the support panel 33. FIG. 3 also shows that although the slideability of member 2 enables the clamp to accept panels of different widths, the interior surface 34 of each such panel is held at a fixed distance from anchor surface 35 as determined by the length of member 7.

When formed of thin sheet metal, the two-part clamp produces further advantages. In FIG. 3 it can be seen that L-shaped member 2 protrudes minimally beyond the surface 36 of panel 32. This means that when the panel is a display mounted in an environment such as a calculator, it is possible to mount the front surface of the display close to the viewing surface. As a result, the angle of view of the display elements from in front of the calculator chassis is maximized.

Because of their structural simplicity, the two L-shaped members can be easily manufactured by simply stamping both from a single piece of sheet metal. Another result of this structural simplicity is that the members can then be easily assembled into a unified clamp by merely snapping them together. Threaded surfaces 16 and 22 can be formed by a variety of techniques well known in the art.

The preceeding description has presented in detail merely a preferred embodiment of the claimed invention. It will be understood, of course, that numerous other alternative embodiments encompassing many variations in the clamps and panels disclosed could be employed without departing from the spirit and scope of the invention as set forth in the appended claims. Among such modified structures would be two-part L-shaped clamps having variations in the shape of the parallel clamping jaws, having additional interfitting bands and open spaces in each of the extension members, and having elongated extension members with a plurality of such clamps molded at intervals along their lengths.

What is claimed is:

1. An adjustable clamp comprising:
   A. a first clamping jaw and a second clamping jaw;
   B. a first extension means connected to said first clamping jaw and a second extension means connected to said second clamping jaw, said first and second extension means being adapted to be placed in overlying relationship to hold said first and second clamping jaws in an adustably opposing relationship;
   said first and second clamping jaws and said first and second extension means forming respective first and second L-shaped members;
   C. mutual interfit means, formed in each of said first and second extension means, for enabling both said extension means to be mutually and slide-adjustably interfitted when said means are placed in the overlying relationship, and for forming an anchor receiving means between said overlying extension means;
   said mutual interfit means comprising apertures and semicylindrical bands formed in each of said first and second extension means;
   the semicylindrical bands of said first extension means being non-threaded and the semicylindrical bands of said second extension means having threads formed therein; at least one of said bands in each of said extension means being received in one of said apertures of the other extension means; and
   D. controllable anchor means, adapted to pass into said anchor receiving means, for securing said overlying extension means together and for producing a controlled sliding of said second extension means with respect to said first extension means, said controlled sliding effecting an adjustable clamping action between said opposing first and second clamping jaws.

2. An adjustable clamp according to claim 1 wherein:
said semicylindrical bands of said first extension means are oppositely disposed to said semicylindrical bands of said second extension means to form a cylindrical channel when said bands are interfitted as said first and second extension means are placed in overlying relationship.

3. An adjustable clamp according to claim 2 wherein:
said anchor receiving means is the cylindrical channel formed by said oppositely-disposed, interfitting, semicylindrical bands.

4. An adjustable clamp according to claim 3 wherein:
the axis of said cylindrical channel is substantially colinear with a line of opposition between said opposing first and second clamping jaws.

5. An adjustable clamp according to claim 4 wherein:
said controllable anchor means is an elongated screw for interengagement with said threaded portions of said second extension means.

6. An adjustable clamp according to claim 5 wherein:
the widths of the semicylindrical bands measured along the length of the cylindrical channel is less than the corresponding widths of the apertures into which the bands fit.

7. An adjustable clamp according to claim 6 wherein:
said screw is adapted to pass through a non-threaded support panel and to extend into the cylindrical channel whereby the interfitting extension means are mounted substantially perpendicular to the support panel.

8. An adjustable clamp according to claim 7 wherein:
said jaws are spaced to hold a panel therebetween.

9. An adjustable clamp according to claim 8 wherein:
said spaced jaws are substantially parallel to each other to hold a panel of predetermined thickness with a uniform application of pressure as the jaws are slideably moved toward each other by said screw.

10. An adjustable clamp according to claim 9 wherein:
the uniform pressure is applied to interchangeable panels of different predetermined thicknesses.

11. A clamp adapted to hold a display panel in a fixed, spaced, parallel relationship to a printed circuit board, said clamp comprising:
a first L-shaped member and a second L-shaped member moveable relative to each other and adapted to be placed in overlying relationship;
each L-shaped member having an elongated arm and a short arm extending at substantially a right angle from said elongated arm;
said L-shaped members, when in said overlying relationship, having said short arms parallel to and spaced apart from each other to receive a panel therebetween;

each said elongated arm having open portions and semicylindrical bands formed adjacent said open portions;

at least one of said semicylindrical bands of each of said elongated arms being received within one of said open portions of the elongated arm of the other L-shaped member when said L-shaped members are in overlying relationship;

said bands of said first L-shaped member being non-threaded and said bands of said second L-shaped member having internal threads formed therein to receive a screw insertable between both said threaded and non-threaded bands to adjustably move said L-shaped members to clampingly engage a display panel between said short arms and to secure said L-shaped members to each other and to a non-threaded printed circuit board.

12. A clamp according to claim 11 wherein:

the widths of the semicylindrical bands measured along the screw axis is less than the corresponding widths of the open portions into which the bands fit.

* * * * *